US012372927B2

(12) United States Patent
Ogawa et al.

(10) Patent No.: US 12,372,927 B2
(45) Date of Patent: Jul. 29, 2025

(54) HAND DISPLAY CONTROL DEVICE, HAND DISPLAY DEVICE, AND RECORDING MEDIUM

(71) Applicant: CASIO COMPUTER CO., LTD., Tokyo (JP)

(72) Inventors: Hiroyoshi Ogawa, Koganei (JP); Mototaka Minakuchi, Fussa (JP); Takako Ono, Tachikawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 679 days.

(21) Appl. No.: 17/672,117

(22) Filed: Feb. 15, 2022

(65) Prior Publication Data

US 2022/0276614 A1 Sep. 1, 2022

(30) Foreign Application Priority Data

Feb. 26, 2021 (JP) ................................ 2021-029991

(51) Int. Cl.
*G04C 17/00* (2006.01)
*G04C 23/06* (2006.01)

(52) U.S. Cl.
CPC ......... *G04C 17/0091* (2013.01); *G04C 23/06* (2013.01)

(58) Field of Classification Search
CPC ............................ G04C 17/0091; G04C 23/06
See application file for complete search history.

(56) References Cited

U.S. PATENT DOCUMENTS

| | | | | |
|---|---|---|---|---|
| 10,754,300 B2 * | 8/2020 | Kato | ...................... | G04C 3/008 |
| 2018/0107165 A1 * | 4/2018 | Kato | ...................... | G04C 3/146 |
| 2022/0236694 A1 * | 7/2022 | Baba | ...................... | G04B 19/04 |

FOREIGN PATENT DOCUMENTS

| | | |
|---|---|---|
| JP | 2011-33430 A | 2/2011 |
| JP | 2014032067 A | 2/2014 |
| JP | 2018096790 A | 6/2018 |

OTHER PUBLICATIONS

Machine translation of Tanaka (JP 2018096790 A, published Jun. 21, 2018) (Year: 2024).*

(Continued)

*Primary Examiner* — Edwin A. Leon
*Assistant Examiner* — Sean R Brannon
(74) *Attorney, Agent, or Firm* — Scully, Scott, Murphy & Presser, P.C.

(57) ABSTRACT

A hand display control device includes a processor. The processor causes an oscillation circuit to output a first frequency signal or a second frequency signal to a first processing circuit that executes processing for operating a hand in response to the first frequency signal. The oscillation circuit outputs the first frequency signal or the second frequency signal by switching. The second frequency signal is higher in frequency than the first frequency signal. The processor controls whether to output the second frequency signal to a second processing circuit that performs previously determined certain processing in response to the second frequency signal. The processor controls the switching of the oscillation circuit depending on whether the certain processing is performed. The processor prohibits the first processing circuit from performing a specific operation of the hand while the second processing circuit is performing the certain processing.

15 Claims, 4 Drawing Sheets

(56) References Cited

OTHER PUBLICATIONS

Machine translation of Inoue (JP 2014032067 A, published Feb. 20, 2014) (Year: 2024).*
Notice of Reasons for Refusal dated Jan. 30, 2024 received in Japanese Patent Application No. JP 2023-012393.

* cited by examiner

HAND DISPLAY CONTROL DEVICE, HAND DISPLAY DEVICE, AND RECORDING MEDIUM

CROSS REFERENCE TO RELATED APPLICATION

This application is based upon and claims the benefit of priority under 35 USC 119 of Japanese Patent Application No. 2021-029991 filed on Feb. 26, 2021, the entire disclosure of which, including the description, claims, drawings and abstract, is incorporated herein by reference in its entirety.

BACKGROUND

1. Technological Field

The present invention relates to a hand display control device, a hand display device, and a recording medium.

2. Description of the Related Art

There are hand display devices which move hands to perform display in accordance with relative positions of the hands with respect to marks, indices, and the like, operation patterns of the hands, and the like. The hands are operated in steps by a stepping motor and the like. Therefore, a fast-forward operation of sequentially performing step operations to change display contents may require time until changing of display is finished depending on the number of step operations or the like.

Timepieces such as analog timepieces which are hand display devices that perform time display and the like perform various types of processing at low clock frequencies, so that a continuous operation over a long time is performed with low consumption power. However, hand display devices that perform driving related to the fast-forward operation of the hands and the like may have an excessively high total load if somewhat high-load processing is performed further in parallel to another type of high-load processing such as communication processing. Thus, there is a technology for shifting processing timings of a plurality of types of processing such that they do not coincide with each other (for example, JP 2011-33430A).

SUMMARY OF INVENTION

According to one aspect of the present invention, a hand display control device includes:

at least one processor, wherein the at least one processor causes an oscillation circuit to output a first frequency signal or a second frequency signal to a first processing circuit that executes processing for operating a hand in response to the first frequency signal, the oscillation circuit outputting the first frequency signal or the second frequency signal by switching, the second frequency signal being higher in frequency than the first frequency signal, controls whether to output the second frequency signal to a second processing circuit that performs previously determined certain processing in response to the second frequency signal, controls the switching of the oscillation circuit depending on whether the certain processing is performed, and prohibits the first processing circuit from performing a specific operation of the hand while the second processing circuit is performing the certain processing.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Hereinafter, an embodiment of the present invention will be described based on the drawings. However, the scope of the invention is not limited to the disclosed embodiments.

Figure 1:
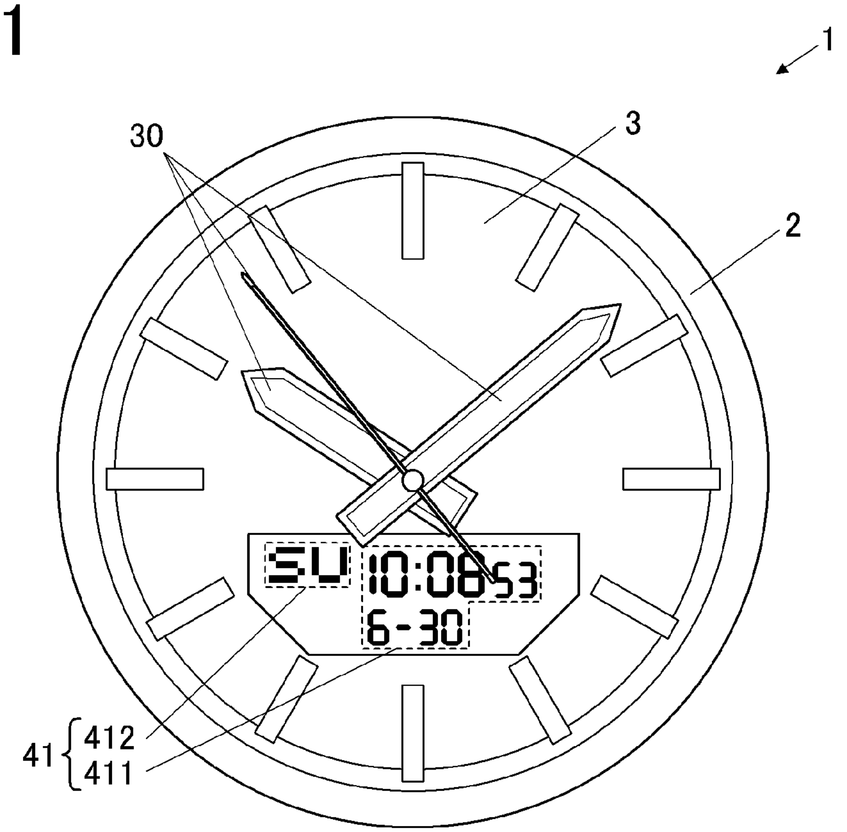
FIG. 1 is a plan view of an electronic timepiece which is a hand display device of an embodiment.

FIG. 1 is a plan view of an electronic timepiece 1 which is a hand display device of the present embodiment.

The electronic timepiece 1 includes a casing 2, a dial 3, hands 30, a digital display screen 41, and the like.

The casing 2 houses therein respective components such as a microcomputer and a battery related to operations of the electronic timepiece 1. The upper and lower sides of the casing 2 are open, and the dial 3 is located on the upper surface (on the side where a user views display). The dial 3 has marks (hour signs) indicating the time, indices, and the like arranged along its peripheral edge. The hands 30 are rotatable above this dial 3 within a plane parallel to the dial 3. Although three hands of an hour hand, a minute hand, and a second hand are illustrated herein as the hands 30, the number of the hands 30 is not limited to three. All the hands 30 do not need to rotate about a common rotation shaft in the vicinity of the center of the dial 3. A transparent windproof glass not shown covers the dial 3 and the hands 30.

The digital display screen 41 is located on the dial 3 in the direction of 6 o'clock, and performs digital display. The digital display screen 41 has a segment display area 411 mainly capable of performing limited display of the time and date or the like, and a dot matrix display area 412 in which characters and a mark indicating the day of week or the like are displayed by dots. The digital display screen 41 may provide dot matrix display as a whole, or may have a segment that is lit up in the form of a dedicated mark. The configuration thereof is not particularly limited.

Figure 2:
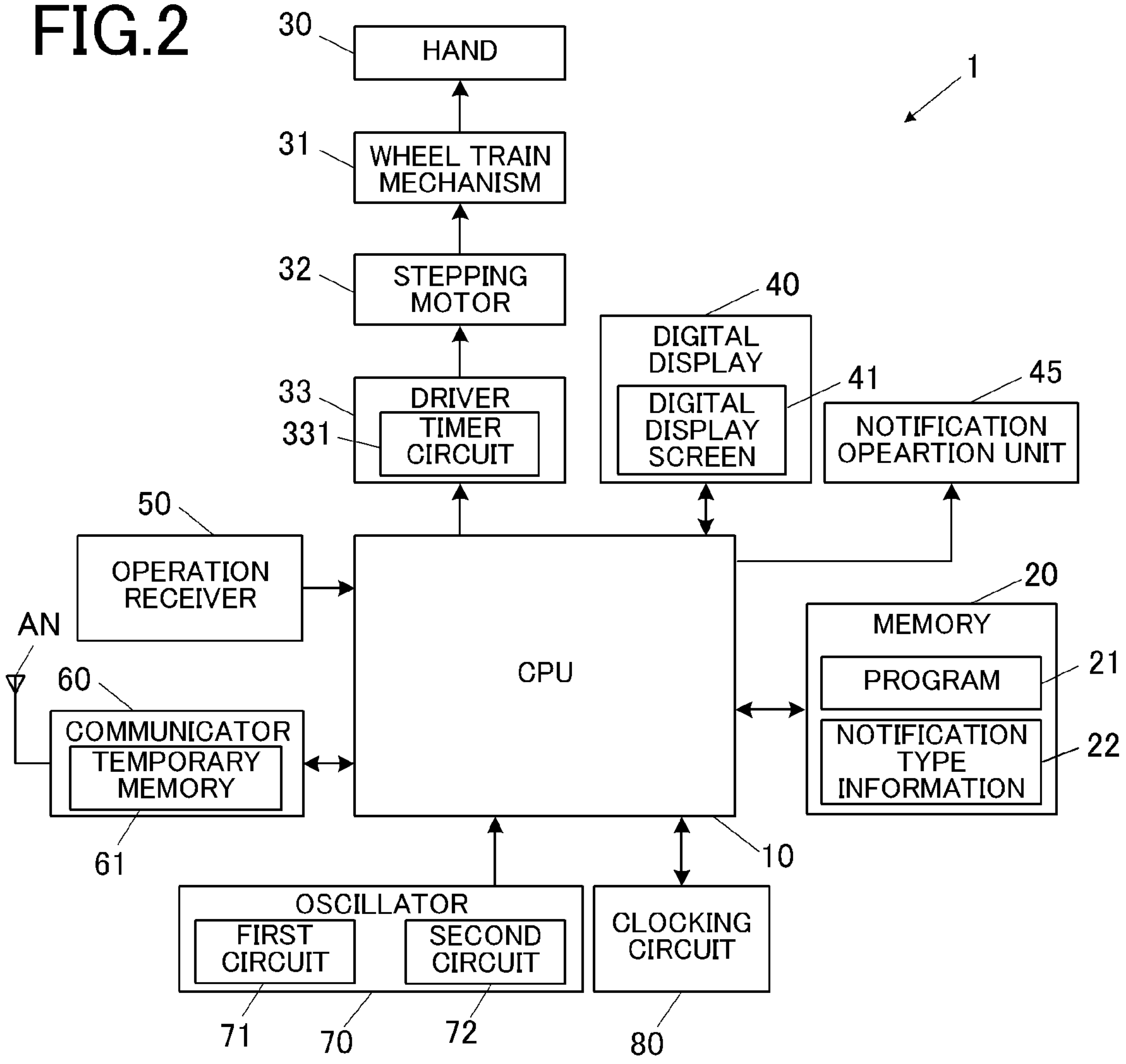
FIG. 2 is a block diagram showing a functional configuration of the electronic timepiece.

FIG. 2 is a block diagram showing a functional configuration of the electronic timepiece 1.

The electronic timepiece 1 is a wristwatch, for example. The electronic timepiece 1 includes a central processing unit (CPU) 10 (a controller and a computer) serving as at least one processor, a memory 20 serving as at least one memory, the hands 30, a wheel train mechanism 31, a stepping motor 32, a driver 33 (a first processor), a digital display (a display), a notification operation unit 45, an operation receiver 50, a communicator 60, an antenna AN, an oscillator 70, a clocking circuit 80, and the like.

The CPU 10 is a processor that performs arithmetic processing, and integrally controls operations of the electronic timepiece 1. The CPU 10 may not be a single processor, but may have a plurality of processors that operate in parallel or each operate individually. The hand display control device of the present embodiment at least includes the CPU 10.

The memory 20 includes a volatile memory, that is, a random access memory (RAM), and a nonvolatile memory. The volatile memory provides a working memory space for the CPU 10, and temporarily stores data. The nonvolatile memory is, for example, a flash memory or the like, and stores a program 21 and setting data. The setting data includes notification type information 22 which will be described later.

The stepping motor 32 performs a rotational operation in which a rotor rotates relative to a stator by a previously determined angle each time a pulsed electric signal is input. The wheel train mechanism 31 is a gear train that rotates in accordance with the rotational operation of the stepping motor 32, and converts a rotation angle of the rotor of the stepping motor 32 into rotation angles of the hands 30 to convey the rotation angles to the rotation shaft of the hands 30. The hands 30 rotate through the wheel train mechanism in accordance with the rotational operation of the stepping motor 32. The electronic timepiece 1 may have the stepping motor 32 and the wheel train mechanism 31 for each of the plurality of hands 30. There may be a plurality of hands 30 caused by the common stepping motor 32 to coordinate to rotate through the wheel train mechanism 31 that branches in the middle.

The driver 33 executes processing of outputting the above-described pulsed electric signal to the stepping motor 32 as a driving signal for rotating the stepping motor 32 (i.e., the hands 30) based on a control signal input from the CPU 10, thereby rotating the hands 30. The driver 33 has a timer circuit 331. The timer circuit 331 counts time intervals (pulse intervals) from output of the driving signal to permission of output of the next driving signal. In other words, while the timer circuit 331 is counting the pulse intervals, the driving signal is not output even if the control signal from the CPU 10 pre-orders the operation of the hands 30. When the next operation is pre-ordered before the timer circuit 331 finishes counting the pulse intervals, driving pulses are continuously output at the pulse intervals, so that a fast-forward operation (specific operation) in which the hands 30 rotate in a fast-forward manner is performed. The driver 33 may drive a plurality of stepping motors 32 at the same time, or may perform adjustment for shifting an output timing of each driving signal so as to output a driving signal exclusively. Data about the operation pre-order is written into a register of the driver 33, and is deleted when a driving signal is output from the driver 33.

The digital display 40 has the digital display screen 41 described above, and performs simple digital display on this digital display screen 41 under the control of the CPU 10. The digital display screen 41 is a liquid crystal display screen, for example, but is not limited thereto. The digital display screen 41 may alternatively be, for example, an organic electro-luminescent (EL) display screen, or the like. The digital display screen 41 includes the segment display area 411 and the dot matrix display area 412 as described above.

The notification operation unit 45 performs a notification operation to be perceived by a user of the electronic timepiece 1 under the control of the CPU 10. The notification operation is not particularly limited, and includes, for example, output of sound such as beeps, generation of vibrations, or the like. A mechanism well-known in the art, for example, an oscillation circuit, a weighted motor, or the like may be used for a mechanism for sound output or generation of vibrations.

The operation receiver 50 receives an input operation from the outside performed by a user or the like, and outputs an input signal based on this input operation to the CPU 10. The operation receiver 50 has one or more push-button switches and a crown, for example. In this case, the input operation to be received may include pressing of a push-button switch, operations of pulling out, pushing back, and rotating the crown, and the like.

The communicator 60 controls wireless communication performed with an external device via the antenna AN according to a communication standard. Although not particularly limited, examples of the communication standard according to which the communicator 60 can exert control include Bluetooth (registered trademark). In particular, the communicator 60 may be capable of performing communication according to the Bluetooth Low Energy standard (denoted by BLE). Alternatively, the communication standard may include various standards for a wireless LAN (Local Area Network). The communicator 60 performs communication processing (certain processing) in response to a second clock signal as will be described later. The communicator 60 corresponds to a second processor according to the present invention. The communicator 60 has a temporary memory 61. The temporary memory 61 is a register, and is thus capable of temporarily storing (buffering or the like) exchange data.

The oscillator 70 oscillates a signal having a certain frequency, and outputs an oscillated frequency signal as a clock signal. The oscillator 70 has a first circuit 71 and a second circuit 72 that output signals having frequencies different from each other. The first circuit 71 oscillates and outputs a 32 to 64-kHz signal, for example, as a first clock signal (a first frequency signal). The second circuit 72 oscillates and outputs a 2-MHz second clock signal (a second frequency signal) higher in frequency than the first clock signal using an oscillating member different from that of the first circuit 71. The oscillator 70 outputs either the first clock signal or the second clock signal to the CPU 10 by selective switching. The CPU 10 outputs the input one of the first clock signal and the second clock signal to the driver 33 and the communicator 60. The oscillator 70 may also have a frequency divider circuit, so that an oscillated frequency is converted into another frequency and output.

The clocking circuit 80 counts the lapse of time based on a signal input from the oscillator 70 via the CPU 10, and holds the date and time. The clocking circuit 80 may be a specific hardware circuit, or the CPU 10 may count and hold the date and time on the RAM of the memory 20. The date and time held by the clocking circuit 80 may be corrected as appropriate based on date-and-time data acquired by the communicator 60 from the outside. The date and time to be held may be that of a time zone (local time) to which a location where the electronic timepiece 1 is currently positioned belongs, or may be fixed to that of a specific time zone. The electronic timepiece 1 capable of simultaneously displaying times of a plurality of time zones (for example, the time at the current position: a base time; and the time at another position set by a user or the like: dual time) may count and hold the times of the plurality of time zones in parallel. Information about the time zones may be separately stored and held in the memory 20. This information may be used for displaying a time zone (such as the name of a city representing the time zone), or in a case in which the date and time of a specific time zone is held, may be utilized for conversion into the local time of a time zone to which the current position of the electronic timepiece 1 or a position targeted for display of the date and time belongs.

Some or all of components that perform control operations, such as the CPU 10, the driver 33, and the communicator 60, may actually operate utilizing a common hardware processor, or may each operate using an individual hardware processor (such as a microcomputer).

Operation control over the hands 30 will now be described.

A rotational operation of the hands 30 is triggered and performed when a control signal (operation pre-order) for moving the hands 30 in either rotational direction is output from the CPU 10 to the driver 33 (interrupt processing). When the control signal is input, the driver 33 outputs a driving signal to the stepping motor 32 in a period during which an operation is not prohibited by counting of the timer circuit 331 as described above, thereby rotating the rotor of the stepping motor 32. In accordance with this rotation of the rotor, the hands 30 rotate through the wheel train mechanism 31.

The CPU 10 causes its own register to store positional information about each of the hands 30, and updates this positional information each time a control signal is output to the driver 33. In a case of fast-forwarding the hands 30 in a plurality of steps, the CPU 10 causes the register to store fast-forward destination positional information in a case in which fast-forward destination positions have been determined, and successively outputs control signals to the driver 33 at the above-described pulse intervals until the current positions of the hands 30 become equal to the fast-forward destination positions or until a fast-forward finish instruction is acquired. The upper limit value of the maximum fast-forward speed is mechanistically determined depending on the magnitude of torque, inertia, and the like of the rotor, and is 16 Hz to 120 Hz, for example. Herein, the maximum fast-forward speed is set at 64 Hz as an example. The fast-forward speed may be different between a case of clockwise fast-forwarding and a case of counterclockwise fast-forwarding. The fast-forward speed may be variable. The fast-forward speed is determined at 64 Hz by the timer circuit 331 of the driver 33 counting, for 1⁄64 second (500 times), a 32-kHz signal as the first clock signal output from the first circuit 71 each time a driving signal is output, for example.

The fast-forward operation is not particularly limited, and may include, for example, changing of the local time (time zone) of the time to be displayed (including switching between the base time and dual time, and the like), changing of the time related to the start and end of daylight saving time, retraction and return of the hands 30 from/to above the digital display screen 41, and the like. In a case of displaying the date by a rotary disc or the like, changing of the date may also be included in the fast-forward operation.

Not only the fast-forward operation of designating movement destinations of the hands 30 and continuing moving the hands 30 at a previously determined moving speed (time intervals) until the hands 30 reach movement destination positions as described above, but also all hand operations including an operation performed at time intervals shorter than those of an operation of the hands 30 related to a basic function, that is, a basic operation such as, for time display, rotating the hands respectively at prescribed time intervals by one step (although not particularly limited, the second hand at intervals of 1 second, the minute hand at intervals of 10 seconds, and the hour hand at intervals of 2 minutes, for example) may be included in the specific operation as operations having high processing loads corresponding to the fast-forward operation. This specific operation may include, for example, operations such as an operation of displaying in real time a measured value obtained in a measuring operation performed by a sensor or the like (for example, more than or equal to 1 Hz) and an operation in a stopwatch function or the like of displaying a counted time down to a numerical value of less than 1 second.

A communication operation and an event occurrence notification operation will now be described.

The electronic timepiece 1 is connected for communication with an external device such as a smartphone through BLE. Communication connection may be maintained all the time (in BLE, in a case in which there is no substantial data to be exchanged, control data is periodically exchanged at intervals wider than those when substantial data is exchanged), but may be disconnected in cases such as, for example, a case in which communication processing is stopped intentionally in the electronic timepiece 1 or the external device by a user's operation or the like, a case in which communication processing is stopped by a reason such as a lack of remaining battery power, and a case in which the electronic timepiece 1 and the external device are not present within a communicable distance range (link loss). The received data is temporarily stored in the temporary memory 61, and then successively transferred to the memory 20.

Information concerning an occurrence of an event (event occurrence information) in the external device may be transmitted to the electronic timepiece 1 in accordance with setting in the external device or the like. The electronic timepiece 1 notifies the occurrence of this event in accordance with the received event occurrence information. The setting in the external device is not particularly limited, and may be performed by a dedicated application program (app) or the like adapted to the event occurrence notification operation in the electronic timepiece 1. When setting information is updated by this application, the setting information is transmitted to the electronic timepiece 1 while communication connection with the electronic timepiece 1 is being established. The notification type information 22 is updated based on the setting information.

Examples of types of events for which the event occurrence information is transmitted to the electronic timepiece 1 include phone calls, incoming emails, incoming messages through Social Networking Service (SNS), notification of registered schedule, and the like. These events are previously determined and stored in the notification type information 22. The external device may be capable of setting whether to notify an occurrence of an event for each type of an event. When these types of event occurrence information are received, the type of an event is specified in the electronic timepiece 1, and the digital display 40 performs the notification operation (previously determined notification operation) of performing display indicating the specified type of an event. The type of an event is specified by, for example, contents of the header of received data or the like. The type of an event that cannot be specified from the contents of the header may be determined uniformly as another type. In a case in which the type may be specified or analogized from contents such as body text other than the header, the relevant portion such as the body text in received data may be analyzed.

FIGS. 3A to 3E are diagrams each showing an example of a notification pattern displayed by the digital display 40.

Figure 3A:
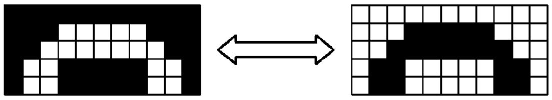
FIG. 3A is a diagram showing an example of a notification pattern displayed on a digital display.

A notification pattern mark (such as an icon) corresponding to the type of an event may be displayed in the dot matrix display area 412 of the digital display 40. In a case in which information related to a phone call is received, an icon indicating the phone is displayed as shown in FIG. 3A. This display may be provided by black-white inversion that is repeated at previously determined time intervals like two black-white inverted images indicated by arrows in which white portions and black portions are inverted from each other (the same applies to the following icons).

Figure 3B:
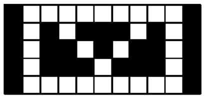
FIG. 3B is a diagram showing an example of a notification pattern displayed on the digital display.
Figure 3C:
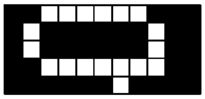
FIG. 3C is a diagram showing an example of a notification pattern displayed on the digital display.
Figure 3D:
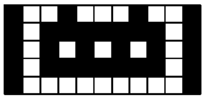
FIG. 3D is a diagram showing an example of a notification pattern displayed on the digital display.
Figure 3E:
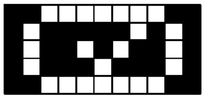
FIG. 3E is a diagram showing an example of a notification pattern displayed on the digital display.

When an email is received, an envelope icon shown in FIG. 3B is displayed. When an SNS message is received, a balloon icon shown in FIG. 3C is displayed. When a schedule notification is received, a calendar icon shown in FIG. 3D is displayed. In a case in which a notification of a type not relevant to the foregoing is received, an icon shown in FIG. 3E is displayed. Image data about these icons may also be included in the notification type information 22, and each may be stored in association with the type of an event.

Operation control related to switching between clock signals will now be described.

In the electronic timepiece 1 of the present embodiment, operations performed by the CPU 10, the driver 33, the digital display 40, the operation receiver 50, and the like have small processing loads, and are sufficiently performed based on the first clock signal output from the first circuit 71. On the other hand, among operations of the electronic timepiece 1, the communication processing performed by the communicator 60 is performed in response to the second clock signal output from the second circuit 72 so as to process data in real time in accordance with the communication speed. Therefore, the clock signal output from the oscillator 70 is switched from the first clock signal to the second clock signal under the control of the CPU 10 while the communication processing is being performed by the communicator 60 (depending on whether the communication processing is performed). Accordingly, each unit that normally operates in response to the first clock signal is also switched to the operation in response to the second clock signal. While the second clock signal is being generated and output, power consumption is temporarily larger than that while the first clock signal is being generated and output, and the amount of heat generated also increases. Thus, when the communication processing is finished, output of the oscillator 70 is returned from the second clock signal to the first clock signal by the CPU 10.

The communication processing as referred to herein includes the above-described processing related to acquisition of event occurrence information and specification of the type of an event. In a state where the communication connection is maintained, pieces of event occurrence information are received one by one as needed. On the other hand, when the communication connection is disconnected for a while as in each of the above-described examples with the setting of notifying an occurrence of an event having been made, data about event occurrence information targeted for transmission is accumulated in an external device, and will be collectively transmitted after resumption of communication connection (a transition from the state in which communication is disconnected to the state in which communication connection is established). In particular, a smartphone that operates using iOS available from Apple Inc. as an operating system (OS) does not perform integral transmission control over data related to a plurality of events (applications). Thus, all pieces of accumulated data about event occurrence information will be received by the communicator 60 continuously at a time. The amount of data received at a time is likely to exceed the capacity of the temporary memory 61 and overflow. By immediately processing received data stored in the temporary memory 61 in response to the second clock signal to move necessary data to the memory 20, processing of receiving data about the event occurrence information is continued stably.

The fast-forward operation of the hands 30 has a high load among types of processing that can be operated in response to the first clock signal. Thus, in order to enable operation control adapted to changing between the frequency signals concerning the fast-forward operation of the hands 30, the configuration is complicated, and a further increase in processing load (increase in power consumption) of the electronic timepiece 1 is not negligible. In the driver 33, update of data related to the fast-forward operation in response to a signal other than the first clock signal is prohibited uniformly in some cases.

Thus, the electronic timepiece 1 prohibits the fast-forward operation (specific operation) of the hands 30 while the communication processing is being performed. The hands being subjected to the fast-forward operation are temporarily halted at positions in the middle (the fast-forward operation is temporarily interrupted). After the communication processing is finished, the fast-forward operation is resumed, so that the hands move to target positions. In a case in which an instruction to perform the fast-forward operation of the hands 30 is acquired while the communication processing is being executed, execution of the fast-forward operation is suspended and held. After the communication processing is finished, the fast-forward operation is started and executed.

A timing of finishing the communication processing may be acquired in real time. Alternatively, a prohibited time (maximum value) of the fast-forward operation until resumption of the fast-forward operation is permitted in the case in which the fast-forward operation is temporarily interrupted may be determined based on the amount of communication predicted in accordance with conditions (such as, for example, OS and a connection status of communication). The amount of communication may be predicted considering not only whether communication connection is resumed, but also the length of a communication disconnected time or the like, for example. The amount of communication may be predicted more dynamically based on a past track record, for example, the amount of events occurred in the same time zone on the previous day or in a certain recent period, or the like. Herein, in a case in which such a condition that the predicted amount of communication (not limited to event occurrence information, but including control data related to establishment of communication connection and another type of communication data) becomes more than or equal to a previously determined reference is satisfied, the prohibited time is determined to be long (a first prohibited time: e.g., 12 seconds). In a case in which it is predicted that the amount of communication is small, the prohibited time is determined to be (a second prohibited time: e.g., 2 seconds) shorter than the above-described first prohibited time, but this is not a limitation. In a case in which the amount of communication can be predicted in more detail and quantitatively, the first prohibited time may be changed dynamically, or prohibited times may be determined in three or more stages.

If occurrences of all events are notified in a case in which the predicted amount of communication (event occurrence information) is large (the above-described condition is satisfied), there may be redundant notifications, and events may no longer have much meaning for the user because of the lapse of time from occurrences of the events. Thus, user's convenience is not necessarily increased. Therefore, the electronic timepiece 1 may omit initial pieces among a plurality of pieces of event occurrence information received in the order of events occurred, and may start acquiring event occurrence information after a reference time (herein, e.g., 10 seconds: the first prohibited time is longer than the reference time) elapses from the start of reception, or may acquire only the last (latest) event occurrence information. The electronic timepiece 1 may store the acquired event occurrence information in the memory 20, and may perform a notification operation related to some types of events specified from the stored event occurrence information.

Figure 4:
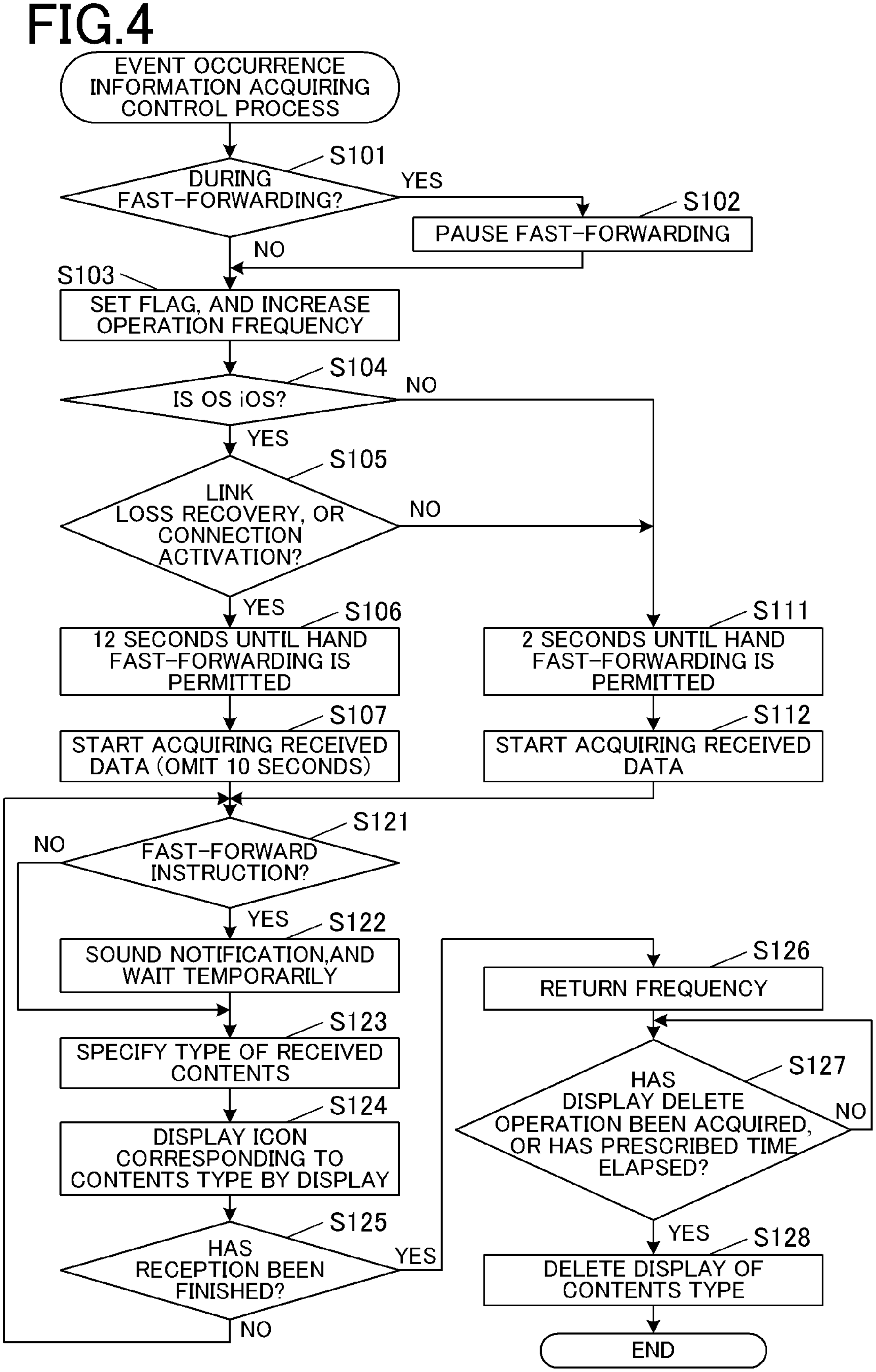
FIG. 4 is a flow chart showing a control procedure of an event occurrence information acquiring control process.

FIG. 4 is a flow chart showing a control procedure performed by the CPU 10 in an event occurrence information acquiring control process executed in the electronic timepiece 1 of the present embodiment.

In a case in which the communicator 60 actually receives data from an external device in a status where the communicator 60 is operating and it has been set to acquire a previously determined type of information from the external device (which may be limited to a case in which the above-described event occurrence information is included), for example, at each communication timing while communication connection is being established, particularly in a case in which the communicator 60 transmits a request for transmission of substantial data to the external device, or in a case in which the communicator 60 receives a request for communication connection transmitted from the external device having received an advertise transmitted from the communicator 60 of the electronic timepiece 1, the event occurrence information acquiring control process is started by notification of information concerning these requests from the communicator 60, or the like.

When the event occurrence information acquiring control process is started, the CPU 10 determines whether the fast-forward operation of the hands 30 is being performed (Step S101). In a case in which the CPU 10 determines that the fast-forward operation of the hands 30 is being performed ("YES" in Step S101), the CPU 10 stops output of a control signal to the driver 33 to pause the fast-forward operation (Step S102). The process of the CPU 10 then proceeds to Step S103. In a case in which the CPU 10 determines that the fast-forward operation of the hands 30 is not being performed ("NO" in Step S101), the process of the CPU 10 proceeds to Step S103.

When the process proceeds from the processing of Step S101 or S102 to the processing of Step S103, the CPU 10 causes the oscillator 70 to operate the second circuit 72 to output the second clock signal from the second circuit 72, and outputs the input second clock signal to the driver 33, the communicator 60, and the like (Step S103).

The CPU 10 determines whether the type of the OS of the external device which is a transmission source of the received data is iOS (Step S104). Information about the OS may previously be held separately in association with BLE pairing information (bonding information) or the like, and may be acquired by referring to this information being held.

In a case in which the CPU 10 determines that the type of the OS of the external device is iOS ("YES" in Step S104), the CPU 10 determines whether the current communication is being performed upon recovery from a link loss or activation of the communicator 60 (Step S105). In a case in which the CPU 10 determines that communication is being performed upon recovery from a link loss or activation of the communicator 60 ("YES" in Step S105), the CPU 10 sets a prohibited time from the start of acquisition of received data in processing of the next Step S107 (or may be from the current time point or from the start of the event occurrence information acquiring control process: there is little difference between these cases) to permission of the fast-forward operation of the hands 30 at 12 seconds (Step S106). The CPU 10 successively acquires the received data from the temporary memory 61 of the communicator 60, and stores the acquired data in the memory 20. At this time, the CPU 10 may directly delete data for 10 seconds from the start of reception without holding the data (Step S107). Alternatively, the CPU 10 may successively overwrite and update the event occurrence information in the memory 20 such that only the last event occurrence information is left. The process of the CPU 10 then proceeds to Step S121.

In a case in which the CPU 10 determines in the determination processing of Step S104 that the OS of the external device which is a transmission source of the received data is not iOS ("NO" in Step S104), the process of the CPU 10 proceeds to Step S111.

In a case in which the CPU 10 determines in the determination processing of Step S105 that the current communication is not being performed upon recovery from a link loss or activation of the communicator 60 ("NO" in Step S105), the process of the CPU 10 proceeds to Step S111.

If the result in Step S104 or Step S105 is "NO" and the process proceeds to processing of Step S111, the CPU 10 sets the prohibited time from the start of acquisition of received data in processing of the next Step S112 (or may be from the current time point or from the start of the event occurrence information acquiring control process) to permission of the fast-forward operation of the hands 30 at 2 seconds (Step S111). The CPU 10 acquires the received data from the temporary memory 61 of the communicator 60, and stores the acquired data in the memory 20 (Step S112). The process of the CPU 10 then proceeds to Step S121.

When the process proceeds from the processing of Step S107 or the processing of Step S112 to processing of Step S121, the CPU 10 determines whether an instruction on a new fast-forward operation has been acquired (Step S121). In a case in which the CPU 10 determines that an instruction on a new fast-forward operation has been acquired ("YES" in Step S121), the CPU 10 causes the notification operation unit 45 to perform a sound (beep) notification operation indicating that the instruction has been acquired, and performs setting of waiting for the fast-forward operation to prohibit fast-forwarding until the time to permission of the fast-forward operation set in Step S106 or S111 elapses (Step S122). At this time, in a case in which settings of fast-forwarding being prohibited (fast-forward destination positions and a fast-forward direction) are updated, the CPU may delete the settings of fast-forwarding being prohibited. The process of the CPU 10 then proceeds to Step S123. In a case in which the CPU 10 determines in the determination processing of Step S121 that an instruction on a new fast-forward operation has not been acquired ("NO" in Step S121), the process of the CPU 10 proceeds to Step S123.

When the process proceeds from the processing of Step S121 or Step S122 to processing of Step S123, the CPU 10 specifies the type of received contents (the type of an event related to the event occurrence information) from the acquired received data based on the notification type information 22 (Step S123). The CPU 10 acquires image data about an icon corresponding to the specified type of contents (the type of the event) from the notification type information 22, and causes the digital display 40 to display an icon corresponding to the image data in the dot matrix display area 412 of the digital display screen 41 (Step S124).

The CPU 10 determines whether reception from the external device has been finished (Step S125). In a case in which the CPU 10 determines that reception from the external device has not been finished ("NO" in Step S125), the process of the CPU 10 returns to Step S121. In a case in which the CPU 10 determines that reception from the external device has been finished ("YES" in Step S125), the CPU 10 (*i*) controls the oscillator 70 such that output of the second clock signal by the second circuit 72 is returned to output of the first clock signal by the first circuit 71 and (ii) outputs the first clock signal output from the oscillator 70 to the driver 33 or the like, and to the communicator 60 according to necessity (for executing processing in a standby state in which communication is not performed, or the like) (Step S126). The CPU 10 may be configured not to return the clock signal output mechanically to the first clock signal until the prohibited time determined above elapses. In a case in which reception has not been finished even when the prohibited time elapses, the prohibited time may be extended.

The CPU 10 determines whether an instruction to delete the icon displayed in the dot matrix display area 412 has been acquired by the operation receiver 50 or whether a prescribed time has elapsed since the icon is displayed (Step S127). In a case in which the CPU 10 determines that an instruction to delete the icon has been acquired or the prescribed time has elapsed since the icon is displayed ("YES" in Step S127), the CPU 10 causes the digital display 40 to delete display of the icon in the dot matrix display area 412 (Step S128). The CPU 10 finishes the event occurrence information acquiring control process. In a case in which the CPU 10 determines that an instruction to delete the icon has not been acquired and the prescribed time has not elapsed since the icon is displayed ("NO" in Step S127), the process of the CPU 10 repeats Step S127.

The processing of Step S103, the determination processing of Step S125, and the processing of Step S126 constitute a frequency control step (a frequency control function of the program 21) in the hand operation control method of the present embodiment. The processing of Step S102, the determination processing of Step S121, and the processing of Step S122 constitute a specific operation prohibiting step (a specific operation prohibiting function of the program 21) in the hand operation control method of the present embodiment.

In a case in which new event occurrence information is received after the processing of Step S126 is finished and before the event occurrence information acquiring control process is finished, a new event occurrence information acquiring control process may be activated in parallel. In response to performing display in the processing of Step S124 in this new process, the event occurrence information acquiring control process previously executed may be finished assuming that the processing of Step S128 in the previous event occurrence information acquiring control process has been executed.

As described above, the hand display control device of the present embodiment includes the CPU 10. The CPU 10 causes the oscillator 70 that outputs the first clock signal or the second clock signal higher in frequency than the first clock signal by switching to output the first clock signal or the second clock signal to the driver 33 serving as the first processor that executes processing for operating the hands 30 in response to the first clock signal, controls whether to output the second clock signal to the communicator 60 serving as the second processor that performs previously determined certain processing, for example, communication processing, in response to the second clock signal, controls switching between the clock signals for output from the oscillator 70 depending on whether the above-described certain processing is executed ("YES" in Step S101, Step S102, "YES" in Step S125, and Step S126 in FIG. 4), and while the second processor is performing the above-described certain processing ("NO" in Step S107, S112, S121 to S124, and S125), prohibits the driver 33 from performing the specific operation of the hands 30 ("YES" in Step S101, Step S102, and Step S122 in FIG. 4).

In this manner, the second clock signal having a high frequency is output only in a case in which processing in response to a frequency signal having a high frequency is necessary, which results in increases in processing load and power consumption. On the other hand, the specific operation of the hands 30 of which high real-time performance is not necessarily required is prohibited while the second clock signal is being output. The CPU 10 thereby improves a desired processing capability while preventing power consumption in the electronic timepiece 1 from increasing (furthermore, the product size from increasing).

In a case in which the second processor starts the above-described certain processing while the driver 33 is performing the specific operation of the hands 30 ("YES" in Step S101 in FIG. 4), the CPU 10 temporarily interrupts the specific operation of the hands 30 (Step S102). In other words, not only by stopping the specific operation from being started during the certain processing in response to the second clock signal having a high frequency, but also by interrupting the already-started specific operation in the middle, processing of the second processor is executed immediately without any delay. In the electronic timepiece 1, it is generally difficult to assume that the above-described certain processing in response to the second clock signal is continually performed for a long time. Therefore, high-priority processing is easily executed more smoothly while preventing power consumption and product size from increasing.

The specific operation is a hand operation that produces a processing load higher than the processing load in the operation related to the basic function (i.e., the time display operation herein) of the hand display device (e.g., the electronic timepiece 1 herein) controlled by the CPU 10. In display that requires the hands 30 to be moved more frequently than in the time display and the like, the processing load related to the hand operation increases even if it is not the fast-forward operation. Such a hand operation that produces a high processing load is included in the specific operation, and the specific operation is prohibited during execution of the above-described certain processing. This enables the processing capability of high-load certain processing (such as the communication processing) that requires an operation in response to the second clock signal to be appropriately improved while avoiding power consumption becoming excessively large at a time.

The above-described specific operation is the fast-forward operation of the hands 30. The fast-forward operation has a high processing load. Thus, when in the operation in response to the second clock signal that originally consumes large power, processing is limited to the above-described certain processing that requires the operation in response to the second clock signal, basic control processing required to be continued irrespective of the frequency of a clock signal, and the like, and this fast-forward operation is prohibited. This prevents the processing load from becoming excessively high, and improves the processing capability of necessary processing.

In a case in which processing related to the fast-forward operation, in particular, an operation of writing into the register, presupposes an operation in response to the first clock signal frequency, the operation in response to the second clock signal is prohibited, thereby easily improving the processing capability of the above-described certain processing in response to the second clock signal while preventing the configuration of the driver 33 from increasing in size and preventing processing from becoming complicated.

The electronic timepiece 1 which is the hand display device includes the communicator 60 that communicates with an external device. The above-described certain processing in response to the second clock signal having a high frequency includes communication processing with an external device performed by the communicator 60. The communication processing that exchanges data with a specific device affects a communication time of an external device or the like in accordance with data transmission intervals. Thus, by increasing the frequency of the frequency signal, data is exchanged smoothly.

The electronic timepiece 1 which is the hand display device includes the memory 20 that stores data. The communicator 60 has the temporary memory 61 that temporarily stores received data. In a case in which conditions related to the predicted amount of received data from an external device are satisfied ("YES" in both of Step S104 and Step S105), the CPU 10 serving as the controller acquires, from the temporary memory 61, received data after the reference time elapses from the start of reception of data, and stores the acquired data in the memory 20 (Step S107). In other words, in a case in which reception of a large amount of data is predicted, initial received data may be discarded directly without acquisition. Data to be displayed on the electronic timepiece 1 is required in many cases to have urgency and replaceability for obtaining contents that cannot be directly checked on the electronic timepiece 1. The value of newly acquiring and utilizing information having become old over time is relatively lower than that of new information. In this manner, by discarding old information and acquiring only new information, the electronic timepiece 1 reduces processing, and improves user's convenience. In a case in which the communicator 60 performs communication through Bluetooth, communication connection itself will be disconnected if received data stored in the temporary memory 61 is too much to be processed and overflow occurs. Data to be received will not be acquired appropriately, and communication connection will be continued to be redone. The electronic timepiece 1 stably acquires necessary information while avoiding such a trouble.

In a case in which the above-described conditions related to the amount of received data are satisfied ("YES" in both of Step S104 and S105), the CPU 10 determines the first prohibited time such as 12 seconds which is longer than the reference time such as 10 seconds from the start of reception of data as the period in which the fast-forward operation of the hands 30 is prohibited (Step S106). In a case in which the above-described conditions are not satisfied, the CPU 10 determines the second prohibited time such as 2 seconds which is shorter than the first prohibited time as the period in which the fast-forward operation of the hands 30 is prohibited (Step S111). By previously setting the prohibited time of the fast-forward operation of the hands 30 in a case of performing the communication operation, particularly, reception of event occurrence information herein, processing is reduced to enable communication processing to be executed more smoothly.

The above-described conditions may include reception in a case in which a transition is made from a state in which communication with the external device is disconnected to a state in which communication connection is established (Step S105). It is difficult to acquire an actual amount of received data at the start of reception from the external device. Therefore, by including a status in which the amount of received data is estimated to be large indirectly in the conditions, the electronic timepiece 1 selectively acquires highly necessary information while reducing the processing load.

The above-described conditions may include the type of the operating system of the external device (Step S104). In a case of receiving respective pieces of information related to a plurality of applications in the external device from the external device, the processing load when receiving data in the electronic timepiece 1 may vary depending on whether the OS of the external device integrally controls output of those pieces of information. Thus, by also using the OS information as an element related to the determination about whether to selectively acquire received data, the electronic timepiece 1 selectively acquires highly necessary information while reducing the processing load.

The CPU 10 serving as the controller causes the communicator 60 to receive previously determined event occurrence information in the external device. In a case in which the event occurrence information is received (Step S123), the CPU 10 performs control for executing a previously determined notification operation, that is, display of a mark (icon) by the digital display 40 in the present embodiment (Step S124). The notification operation of the event occurrence information in the electronic timepiece 1 is effective in such a case in which the user is unable to hold or keep the external device in hand, and immediacy is important for such information. By immediately performing processing of receiving such information in response to the second clock signal and reducing power consumption, user's convenience of the electronic timepiece 1 is improved.

The CPU 10 serving as the controller specifies the type of an event related to the received occurrence information, and causes the digital display 40 to display an icon indicating the specified type, thereby causing the notification operation to be performed (Step S124). By causing the notification operation related to the occurrence of the event to be performed by display on the digital display screen 41, the user's ability to determine the type of the event is easily increased as compared with another notification operation using a sound pattern, a vibration pattern, or the like.

In a case in which pieces of occurrence information about a plurality of types of events are successively received by the communicator 60 from the external device, the CPU 10 serving as the controller causes the digital display 40 to perform display indicating some of the plurality of types. As described above, immediacy is important for the event occurrence notification operation. If old occurred events are all displayed in sequence, mixing of displays that are less useful for the user, an extended display time, repetition of an identical display, and the like will reduce user's convenience. Therefore, the electronic timepiece 1 increases user's convenience by selecting only displays related to some types and narrowing down notification contents to be conveyed to the user.

The above-described some types may be types related to events in recently received occurrence information. In other words, by displaying only the type of the latest occurred event, only immediacy is emphasized, and a user's determination related to acquisition of information is eased.

The electronic timepiece 1 which is the hand display device of the present embodiment includes the above-described CPU 10, the hands 30, the driver 33 serving as the first processor that executes processing for operating the hands 30 in response to the first clock signal, the communicator 60 serving as the second processor that performs previously determined certain processing, for example, communication processing in response to the second clock signal, and the oscillator 70 that outputs the first clock signal or the second clock signal by switching. The electronic timepiece 1 outputs the second clock signal only in a case in which processing in response to a frequency signal having a high frequency is necessary. This prevents power consumption from increasing in an unnecessary case. The specific operation of the hands 30 of which high real-time performance is not necessarily required but which has somewhat high operation load is prohibited while the second clock signal is being output. The electronic timepiece 1 thereby improves the processing capability while preventing increase in power consumption and occurrence of an excessively high load.

The hand display operation control method of the present embodiment includes a first output step of causing the oscillator 70 to output the first clock signal or the second clock signal to the driver 33, a second output step of controlling whether to output the second clock signal to the communicator 60 which is the second processor that performs previously determined certain processing (for example, communication processing) (Steps S103 and S126 for both the first output step and the second output step), a frequency control step (Step S103, "YES" in S125, and S126) of controlling the switching of the oscillator 70 that outputs the first clock signal or the second clock signal by switching depending on whether the communication processing which is the above-described certain processing performed by the communicator 60 is performed, and a specific operation prohibiting step (Step S102, "YES" in Step S121, and S122) of prohibiting the driver 33 from performing the fast-forward operation which is the specific operation of the hands 30 while the communicator 60 serving as the second processor is performing the above-described certain processing.

In this manner, the control operation of outputting the second clock signal only in a case in which processing in response to a frequency signal having a high frequency is necessary and prohibiting the fast-forward operation of the hands 30 while the second clock signal is being output enables control over the hand operation that prevents increase in power consumption of the electronic timepiece 1 and improves a desired processing capability.

The program 21 of the present embodiment causes the computer (the CPU 10) of the electronic timepiece 1 to achieve a first output function of causing the oscillator 70 to output the first clock signal or the second clock signal to the driver 33, a second output function (Steps S103 and S126 for both the first output function and the second output function) of controlling whether to output the second clock signal to the communicator 60 serving as the second processor that performs previously determined certain processing (for example, communication processing), a frequency control function (Step S103, "YES" in S125, and S126) of controlling switching of the oscillator 70 that outputs the first clock signal or the second clock signal by switching depending on whether the above-described certain processing (communication processing of the communicator 60) is performed, and a fast-forward prohibiting function (Step S102, "YES" in Step S121, and S122) of prohibiting the driver 33 from performing the fast-forward operation which is the specific operation of the hands 30 while the communicator 60 serving as the second processor is performing processing in response to the second clock signal.

By installing the program 21 in a hand display control device (hand display device) that outputs a selected one of two types of clock signals to control the hand operation, control over the hand operation is performed which easily prevents increase in power consumption and improves a desired processing capability without providing an additional component that would result in size increase and complicatedness of the electronic timepiece 1.

The present invention is not limited to the above-described embodiment, and may be modified variously.

For example, in the above-described embodiment, the fast-forward operation of the hands shall be prohibited depending on conditions, and a time (prohibited time of the fast-forward operation) from the start of the above-described certain processing to a timing when the fast-forward operation of the hands is permitted shall be set. However, whether to permit the fast-forward operation of the hands may be determined only based on whether the communication processing is performed, and only whether to omit received data may be determined depending on the above-described conditions. Alternatively, if recent event occurrence information alone is always acquired, the CPU 10 may update data about the event occurrence information by overwriting and hold the data each time an event occurs, without performing a determination about the conditions.

In the above-described embodiment, priority shall be always given to execution of the communication processing (certain processing) over the fast-forward operation (specific operation), but this is not a limitation. It is sufficient that the fast-forward operation is not performed concurrently with and in parallel to the communication processing. For example, in such a case in which the remaining time of the fast-forward operation is short, exchange of data (other than control data or the like) performed by the communication processing may be started after the fast-forward operation is finished.

In the above-described embodiment, in a case in which an instruction to start fast-forwarding (specific operation) is acquired during execution of the communication processing (certain processing), the notification operation shall be performed by the notification operation unit 45, but the notification operation may not be always performed. For example, the notification operation may be performed only in a case in which the instruction on the fast-forward operation is manually acquired by the operation receiver 50. In a case in which it is determined by internal processing of the CPU 10 that it is the timing to start the fast-forward operation and the fast-forward start instruction is issued irrespective of a user's operation or the like, the notification operation may not be performed. Alternatively, the notification operation may not be performed irrespective of the type of a start instruction. Whether to perform the notification operation may be switched by settings.

In the above-described embodiment, as soon as the type of event occurrence information acquired is specified, an icon corresponding to the type of contents shall be displayed on the digital display 40, but an icon corresponding to the type of event occurrence information acquired most recently may be displayed after reception is finished.

In the above-described embodiment, the type of a recent one or some events occurred shall be selectively displayed when a plurality of pieces of event occurrence information are received, but this is not a limitation. Even slightly old information is in some cases highly useful for the user depending on the type of an event. Thus, a determination criterion for usefulness may be determined previously, and whether display (notification) is necessary may be determined for each of old events. Also in this case, events occurred redundantly may be integrated into one display, rather than being displayed multiple times.

Although the above-described embodiment has been described assuming that contents received from the external device are event occurrence information, information other than the event occurrence information may actually be acquired. Even in this case, there is no difference in determination criterion about whether the event occurrence information may be received collectively. Thus, processing can be performed similarly to that described in the above-described embodiment. In a case in which it is determined in the determination processing of Step S123 in FIG. 4 that the received contents do not include event occurrence information, the CPU 10 simply omits the processing related to display of an icon on the digital display screen 41 and deletion of the icon (Steps S124, S127, and S128).

Although the above-described embodiment has been described assuming that the hands 30 rotate about the rotation shaft, the electronic timepiece 1 may have hands that move in parallel within a certain set range. Even in the case in which the hands rotate, the hands may reciprocate only within a certain angular range, rather than being rotatable by 360 degrees. The hands as referred to herein include those such as a rotary disc which are capable of performing an operation related to display by a stepping motor. In some cases, the plurality of hands 30 are divided into a plurality of groups each including some of the hands 30 to perform display operations different from each other. At this time, a group that performs a display operation having a processing load higher than the processing load of the display operation related to the basic function (that is, the time display operation in the electronic timepiece 1) may be prohibited from performing the display operation while the above-described certain processing is being performed.

Although the above-described embodiment has been described assuming that the type of an event is specified and displayed, the type may be specified in more detail. For example, SNS may each be specified individually for each application. To the contrary, only a fact that some event has occurred in an external device may be notified without specifying the type of the event. In this case, a user recognizes the occurrence of the event more easily without limiting the notification method to display. A real-time notification operation itself is not essential for the present invention. For example, log information may be received, acquired, and the like, and data or the like may be invoked and displayed by an input operation received later by the operation receiver 50. Data to be received and notified may be simple navigation data or the like rather than the event occurrence information.

Although the above-described embodiment has been described assuming that an external device operates so as to transmit the event occurrence information irrespective of whether communication connection is being maintained or disconnected, this is not a limitation. Processing of trying to transmit event occurrence information from the external device may not be performed while communication connection is being disconnected through normal processing.

Although the above-described embodiment has been described using communication processing as an example of certain processing, this is not a limitation. High-load processing that needs to be performed at a frequency temporarily increased, such as, for example, real-time measurement and analytical processing through use of a sensor or the like, may also be included in the above-described certain processing performed in response to the second clock signal.

Although the above-described embodiment has been described assuming that the hand display device is the electronic timepiece 1, this is not a limitation. Any display device may be adopted which performs display using the hands, and may perform a specific operation having a processing load higher than that of the operation of the hands 30 related to the basic function such as the fast-forward operation of the positions of the hands. In this case, the processing load of the hand operation increases even during a display operation of the display device. Thus, not only the fast-forward operation or the like, but also all hand operations may be prohibited as specific operations while certain processing (communication processing) is being executed.

Although the above has been described using a nonvolatile memory such as the flash memory of the memory 20 as an example of a computer-readable medium that stores the program 21 including the hand operation control according to the present invention, this is not a limitation. Other nonvolatile memories such as a HDD (Hard Disk Drive) and a MRAM, and portable recording media such as a CD-ROM and a DVD disc are applicable as another computer-readable medium. Carrier waves are also applied to the present invention as a medium for providing data on the program according to the present invention through a communication network.

In addition, the specific configuration, contents and procedure of processing operation, and the like shown in the above embodiment(s) may be appropriately modified within the scope of the present invention.

Although some embodiments of the present invention have been described, the present invention is not limited to the embodiments described above but includes the scope of the invention described in the scope of claims and the scope of their equivalents.

What is claimed is:

1. A hand display control device comprising:

at least one processor, wherein the at least one processor is configured to:

cause an oscillation circuit to output a first frequency signal and input the first frequency signal to a first processing circuit that executes processing for operating a hand in response to the first frequency signal;

cause the oscillation circuit to output a second frequency signal and output the second frequency signal to a second processing circuit that performs predetermined processing according to the second frequency signal, the oscillation circuit outputting the first frequency signal or the second frequency signal by switching, the second frequency signal being higher in frequency than the first frequency signal;

control the switching of the oscillation circuit depending on whether the predetermined certain processing is performed; and prohibit the first processing circuit from performing a specific operation of the hand while the second processing circuit is performing the predetermined processing, wherein the specific operation is a hand operation that produces a processing load higher than a processing load in an operation of the hand related to a basic function of a hand display device controlled by the at least one processor.

2. The hand display control device according to claim 1, wherein the at least one processor is configured to temporarily interrupt the specific operation in a case in which the second processing circuit starts the predetermined processing while the first processing circuit is performing the specific operation of the hand.

3. The hand display control device according to claim 1, wherein the specific operation is a fast-forward operation of the hand.

4. The hand display control device according to claim 1, wherein the second processing circuit includes a communication circuit configured to communicate with an external device, and wherein the predetermined processing includes communication processing with the external device performed by the communication circuit.

5. The hand display control device according to claim 4, further comprising:

at least one memory configured to store data, wherein the communication circuit includes a temporary memory configured to temporarily store received data from the external device, and wherein, in a case in which a condition related to a predicted amount of data to be received from the external device is satisfied, the at least one processor is configured to acquire, from the temporary memory, the received data after a reference time elapses from start of reception of data from the external device, and store the received data as acquired in the at least one memory.

6. The hand display control device according to claim 5, wherein in a case in which the condition related to the predicted amount of data to be received is satisfied, the at least one processor is configured to determine a first prohibited time from start of reception of data from the external device which is longer than the reference time as a period in which the specific operation of the hand is prohibited, and in a case in which the condition is not satisfied, the at least one processor determines a second prohibited time which is shorter than the first prohibited time as the period in which the specific operation of the hand is prohibited.

7. The hand display control device according to claim 5, wherein in a case in which the condition related to a predicted amount of data to be received from the external device is satisfied and a condition related to a transition being made from a state in which communication with the external device is disconnected to a state in which communication connection with the external device is established is satisfied, the at least one process is configured to acquire, from the temporary memory, the received data after the reference time elapses from start of reception of data from the external device, and store the received data as acquired in the at least one memory.

8. The hand display control device according to claim 5, wherein the predicted amount of data to be received from the external device is dependent on a type of an operating system of the external device.

9. The hand display control device according to claim 4, wherein the at least one processor is configured to:

cause the communication circuit to receive previously determined event occurrence information in the external device; and in a case in which the occurrence information is received, perform control for executing a previously determined notification operation.

10. The hand display control device according to claim 9, wherein the at least one processor is configured so:

specify a type of an event related to the occurrence information as received; and cause a display that performs digital display to perform display indicating the type as specified to cause the notification operation to be performed.

11. The hand display control device according to claim 10, wherein in a case in which the communication circuit successively receives the occurrence information about a plurality of types of events from the external device, the at least one processor is configured to cause the display to perform display indicating some of the plurality of types.

12. The hand display control device according to claim 11, wherein the some of the types are types related to the occurrence information received within a predetermined most recent period of time.

13. A hand display device comprising:

the hand display control device according to claim 1;

a hand;

a first processing circuit that executes processing for operating the hand in response to the first frequency signal;

an oscillation circuit that outputs the first frequency signal or the second frequency signal by switching; and a second processing circuit that performs the certain processing in response to the second frequency signal.

14. A non-transitory computer-readable recording medium storing a program that causes a computer to achieve:

cause an oscillation circuit to output a first frequency signal and input the first frequency signal to a first processing circuit that executes processing for operating a hand in response to the first frequency signal;

cause the oscillation circuit to output a second frequency signal and output the second frequency signal to a second processing circuit that performs predetermined processing according to the second frequency signal, the oscillation circuit outputting the first frequency signal or the second frequency signal by switching, the second frequency signal being higher in frequency than the first frequency signal;

control the switching of the oscillation circuit depending on whether the predetermined processing is performed; and prohibit the first processing circuit from performing a specific operation of the hand while the second processing circuit is performing the predetermined processing, wherein the specific operation is a hand operation that produces a processing load higher than a processing load in an operation of the hand related to a basic function of a hand display device controlled by the computer.

15. A hand display control device comprising:

at least one processor, wherein the at least one processor is configured to:

cause an oscillation circuit to output a first frequency signal and input the first frequency signal to a first processing circuit that executes processing for operating a hand in response to the first frequency signal;

cause the oscillation circuit to output a second frequency signal and output the second frequency signal to a second processing circuit that performs predetermined processing according to the second frequency signal, the oscillation circuit outputting the first frequency signal or the second frequency signal by switching, the second frequency signal being higher in frequency than the first frequency signal;

control the switching of the oscillation circuit depending on whether the predetermined processing is performed; and prohibit the first processing circuit from performing a specific operation of the hand while the second processing circuit is performing the predetermined processing, wherein the second processing circuit includes a communication circuit configured to communicate with an external device, and wherein the predetermined processing includes communication processing with the external device performed by the communication circuit; and at least one memory configured to store data, wherein the communication circuit includes a temporary memory configured to temporarily store received data from the external device, and wherein, in a case in which a condition related to a predicted amount of data to be received from the external device is satisfied, the at least one processor is configured to acquire, from the temporary memory, the received data after a reference time elapses from start of reception of data from the external device, and store the received data as acquired in the at least one memory.

* * * * *